United States Patent
Ye et al.

(10) Patent No.: US 11,604,088 B2
(45) Date of Patent: Mar. 14, 2023

(54) AUTOMATED DEVICE FOR IN-SITU MEASUREMENTS OF GROUNDWATER FLUXES TO SURFACE WATER BODIES

(71) Applicant: The Florida State University Research Foundation, Inc., Tallahassee, FL (US)

(72) Inventors: Ming Ye, Tallahassee, FL (US); Kyle A. Compare, Tallahassee, FL (US); Daniel J. Dominguez, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 17/364,040

(22) Filed: Jun. 30, 2021

(65) Prior Publication Data

US 2022/0011149 A1     Jan. 13, 2022

Related U.S. Application Data

(60) Provisional application No. 63/049,769, filed on Jul. 9, 2020.

(51) Int. Cl.
    *G01F 23/72*      (2006.01)
    *G01C 13/00*      (2006.01)

(52) U.S. Cl.
     CPC ............. *G01F 23/72* (2013.01); *G01C 13/00* (2013.01)

(58) Field of Classification Search
     CPC ................... G01F 23/72; G01F 23/74
     See application file for complete search history.

(56) References Cited

U.S. PATENT DOCUMENTS

| | | | | |
|---|---|---|---|---|
| 6,375,835 | B1 * | 4/2002 | Lee | C02F 1/40 210/123 |
| 6,491,828 | B1 * | 12/2002 | Sivavec | G01N 33/18 210/170.07 |
| 6,993,437 | B1 * | 1/2006 | Chadwick | G01V 9/02 702/45 |
| 7,023,224 | B2 * | 4/2006 | Ansari | G01D 5/165 324/609 |
| 7,610,807 | B2 * | 11/2009 | Skinner | G01F 23/2963 73/290 V |
| 10,671,560 | B2 * | 6/2020 | Brown | G06F 13/4027 |
| 2017/0370893 | A1 * | 12/2017 | West | G01N 33/1893 |

OTHER PUBLICATIONS

Solomon et al.,"An Automated Seepage Meter for Streams and Lakes", Water Resources Research, 56 (Apr. 2020).*
MTS Systems Corporation, "Temposonics", 2012.*
Belanger, T. V, Mikutel, D.F., and Churchill, P.A., 1985, Groundwater seepage nutrient loading in a Florida Lake: Water Research, v. 19, p. 773-781, doi:https://doi.org/10.1016/0043-1354(85)90126-5.

(Continued)

*Primary Examiner* — Justin N Olamit
(74) *Attorney, Agent, or Firm* — Meunier Carlin & Curfman LLC

(57) ABSTRACT

Disclosed is a seepage meter device, which is capable of detecting groundwater seepage fluxes to surface water bodies in a variety of aquatic environments. The device comprises a seepage meter body and an electronics component.

22 Claims, 7 Drawing Sheets

(56) References Cited

OTHER PUBLICATIONS

Belanger, T. V, and Montgomery, M.T., 1992, Seepage meter errors: Limnology and Oceanography, v. 37, p. 1787-1795, doi:10.4319/lo.1992.37.8.1787.

Burnett, W.C., Kim, G., and Lane-Smith, D., 2001, A continuous monitor for assessment of 222Rn in the coastalocean: Journal of Radioanalytical and Nuclear Chemistry, v. 249, p. 167-172, doi:10.1023/A:1013217821419.

Castro, R.B.P., 2017, Statistical Analysis of Karst Aquifer Pollution, Karst Flow Model Validation at Laboratory Scale, and Development of Seepage Meter: Florida State University, 69-85 p., http://purl.flvc.org/fsu/fd/FSU_SUMMER2017_PachecoCastro_fsu_0071E_14073.

Chanyotha, S., Kranrod, C., Burnett, W.C., Lane-Smith, D., and Simko, J., 2014, Prospecting for groundwater discharge in the canals of Bangkok via natural radon and thoron.: Journal of Hydrology (Amsterdam), v. 519, p. 1485-1492, doi:10.1016/j.jhydrol.2014.09.014.

Downing, D.M., Winer, C., and Wood, L.D., 2003, Navigating Through Clean Water Act Jurisdiction:A Legal Review: Wetlands, v. 23, p. 475-493, https://doi.org/10.1672/0277-5212(2003)023[0475:NTCWAJ]2.0.CO.

Fellows, C.R., and Brezonik, P.L., 1980, Seepage Flow Into Florida Lakes1: JAWRA Journal of the American Water Resources Association, v. 16, p. 635-641, doi:10.1111/j.1752-1688.1980.tb02442.x.

Harper, H., 2013, Evaluation of Hydrologic Nutrient Loadings from Groundwater.

Kish, S., Milla, K., and Means, R., 2012, Dynamics of Water Levels in Ephemeral Ponds of the Munson Sandhills, Lower Coastal Plain of Northwest Florida.

Krupa, S.L., Belanger, T. V, Heck, H.H., Brock, J.T., and Jones, B.J., 1998, Krupaseep—The Next Generation Seepage Meter: Journal of Coastal Research, p. 210-213, http://www.jstor.org/stable/25736139.

Lee, D.R., 1977, A device for measuring seepage flux in lakes and estuaries1: Limnology and Oceanography, v. 22, p. 140-147, doi:10.4319/lo.1977.22.1.0140.

Lucius, M., 2016, Creating a Water and Nutrient Budget for Lake Trafford, FL, USA, Thesis, 131 pages.

Marton, J.M., Creed, I.F., Lewis, D.B., Lane, C.R., Basu, N.B., Cohen, M.J., and Craft, C.B., 2015, Geographically Isolated Wetlands are Important Biogeochemical Reactors on the Landscape: BioScience, v. 65, p. 408-418, doi:10.1093/biosci/biv009.

Means, D.B., 2007, Life Cycles, Dispersal, and Critical Habitat Utilization of Vertebrates Dependent Upon Small Isolated Water Bodies in the Munson Sandhills and Woodville Karst Plain, Leon County, Florida.

Rosenberry, D.O., and LaBaugh, J.W., 2008, Field Techniques for Estimating Water Fluxes Between Surface Water and Ground Water: U.S. Geological Survey Techniques and Methods 4-D2, p. 71-114. https://doi.org/10.3133/tm4D2.

Rosenberry, D., LaBaugh, J., and Hunt, R., 2008, Use of monitoring wells, portable piezometers, and seepage meters to quantify flow between surface water and ground water: D2 p.

Rosenberry, D.O., and Menheer, M.A., 2006, A system for calibrating seepage meters used to measure flow between ground water and surface water: US Geological Survey Scientific Investigations Report 2006-5053.

Schiffer, D.M., 1998, Hydrology of Central Florida Lakes—A Primer. 45 pages. doi:10.3133/cir1137.

Shaw, R.D., and Prepas, E.E., 1990, Groundwater-lake interactions: I. Accuracy of seepage meter estimates of lake seepage: Journal of Hydrology, v. 119, p. 105-120, doi:https://doi.org/10.1016/0022-1694(90)90037-X.

Smith, C.F., Chadwick, D.B., Paulsen, R.J., and Groves, J.G., 2003, Development and deployment of an ultrasonic groundwater seepage meter: a reliable way to measure groundwater seepage, in Oceans 2003. Celebrating the Past . . . Teaming Toward the Future (IEEE Cat. No.03CH37492), v. 1, p. 149-157 vol. 1, doi:10.1109/OCEANS.2003.178537.

Solder, J., Gilmore, T., Genereux, D., and Solomon, D., 2016, A Tube Seepage Meter for In Situ Measurement of Seepage Rate and Groundwater Sampling: Ground water, v. 54, p. 588-595, doi:10.1111/gwat.12388.

Taniguchi, M., and Fukuo, Y., 1993, Continuous Measurements of Ground-Water Seepage Using an Automatic Seepage Meter: Groundwater, v. 31, p. 675-679, doi:10.1111/j.1745-6584.1993.tb00601.x.

Thomas, S., and Lucius, M., 2016, Groundwater seepage nutrient loading in a recently dug wet detention stormwater pond: Florida Scientist, v. 79, p. 132-146, http://www.jstor.org/stable/44113170.

Tiner, R., 2003, Geographically isolated wetlands of the United States: Wetlands, v. 23, p. 494-516, doi:10.1672/0277-5212(2003)023%5B0494:GIWOTU%5D2.0.CO;2.

Winter, T.C., 1981, Uncertainties in Estimating the Water Balance of LAKES1: JAWRA Journal of the American Water Resources Association, v. 17, p. 82-115 doi:10.1111/j.1752-1688.1981.tb02593.

* cited by examiner

AUTOMATED DEVICE FOR IN-SITU MEASUREMENTS OF GROUNDWATER FLUXES TO SURFACE WATER BODIES

CROSS-REFERENCE TO RELATED APPLICATIONS

This application claims benefit of U.S. Provisional Application No. 63/049,769, filed Jul. 9, 2020, incorporated herein by reference in its entirety.

FIELD

The present disclosure relates generally to measuring fluxes which occur at the interface between groundwater and surface waterbodies, and the effect that has on surface water bodies. This has applicability in the fields of water resource management and environmental studies.

BACKGROUND

Within water budgets of surface water bodies, groundwater inputs and outputs, which are referred to as groundwater seepage hereinafter, are often overlooked. In traditional hydrologic studies, these values are frequently deemed negligible as they are typically orders of magnitude lesser than the surficial water inputs and outputs. However, there are certain environments where this assumption does not hold true and there are significant dynamics associated with the groundwater exchange. An example of this is in Florida where over 70% of lakes are considered seepage lakes, which contain no surface water inputs (Schiffer, 1998). In these cases, traditional hydrologic models, which emphasize surface water, do not account for a significant portion of the water budget.

Another example of these groundwater influenced environments are features known as Geographically Isolated wetlands (GIWs). GIWs are defined as a wetland surrounded by uplands, so that it does not have surface connections to other surface water bodies (Tiner, 2003). Previously known as "isolated wetlands," these features were renamed as they are not isolated from surrounding features, as groundwater exchange serves as a connecting factor between wetlands (Tiner, 2003). GIWs are special in that they encompass a variety of different types of wetlands that have different characteristics but share the fact that they do not have surficial inputs, such as karst ponds, vernal pools, prairie potholes, and playa lakes (Tiner, 2003). GIWs have been the focus of many studies after their federal protection under the Clean Water Act was revoked in a 2001 US Supreme Court case (Downing et al., 2003). GIWs have been thought to be biogeochemical hotspots that are useful in removing pollutants and nutrients to down gradient water bodies (Marton et al., 2015). In order to understand the biogeochemistry, understanding the water budget and dynamics is essential.

On top of these important processes, GIWs play a large ecological role as well. Due to their lack of surficial inputs, GIW input is fed by groundwater and precipitation. These inputs vary seasonally and lead to periodic, wetting and drying cycles, known as "hydroperiods" (Kish et al., 2012). These hydroperiods prevent predatory fish from habituating number of GIWs, allowing these environments to act as a safe breeding ground for amphibians, such as the endangered Striped Newt (Means, 2007).

In order to measure groundwater seepage, seepage meters based on the design from Lee (1977) are often used. This method has been the most common way to measure groundwater seepage over the years due to the meter's simple design and ease of use. However, there are a number of errors associated with this design and one major drawback is that it is not automated. Automated measurements of groundwater seepage is indispensable to understanding water dynamics and to supporting science-informed decision making for water resources management. While there have been a number of improvements since the initial design, they are fundamentally similar and encounter many of the same errors.

What is needed in the art is a seepage meter that is automated, can measure both groundwater inflow and outflow, is versatile for a variety of different environments, eliminates some of the sources of error in the traditional seepage meter, and provide more precise results in a shorter time period than the traditional methods used. Such as device is disclosed herein, and addresses these and other needs.

SUMMARY

Disclosed herein is a seepage meter device comprising a seepage meter body and an electronics component; wherein the seepage meter body comprises a collection tube and a sensor; and wherein the electronics component is capable of automatically measuring and recording changing water levels.

The sensor and collection tube of the seepage meter body can be coupled via a coupler. The seepage meter body can comprise a collection tube containing a port that is fitted to a valve. The sensor can be a linear position level sensor, such as a Temposonics C-Series sensor. A float with a magnet can be enclosed within the collection tube, and the float with the magnet can be fitted around the sensor. A position sensor shaft can electromagnetically coupled to the sensor to the float with a magnet. The seepage meter body can further comprises a motor in communication with a valve mechanism, wherein the valve mechanism is capable of opening and closing the collection tube. The valve mechanism can comprise a valve cap, a valve bracket, and a valve cavity.

The electronic component of the seepage meter device can comprise a waterproof electronic housing, at least two microcontrollers, and a power supply. The microcontrollers can comprise a motherboard and daughterboard. The electronics component can further comprise a solar panel. In one embodiment, at least one microcontroller can comprise a timer, wherein said timer is capable of limiting power consumption of the seepage meter device. The timer can provide full power to the microcontroller only when activated at a preset time interval. The microcontroller can interface via radio frequency with a device for sending/receiving data packets, such as Long Range radio or Bluetooth.

Also disclosed is a method for detecting water levels in an aqueous environment, the method comprising: installing a seepage meter device in a body of water in which water levels are to be measured, wherein said seepage meter device comprises a seepage meter body and an electronics component; wherein the seepage meter body further comprises a collection tube and a sensor; and measuring and recording changing water levels.

The distal end of the seepage meter body can installed in a sediment bottom of a water body, and a proximal end of the seepage meter body is exposed to air. The electronic component can be separately installed in a sediment bottom in close proximity to the seepage meter body. The seepage meter body can further comprise a motor and a valve, wherein the motor opens the valve, allowing the water level within the collection tube to equilibrate with water body's water stage. In one embodiment, when the valve is opened, a water level measurement can be recorded. After the water level measurement is recorded, the motor can optionally close the valve.

BRIEF DESCRIPTION OF THE FIGURES

The accompanying figures, which are incorporated in and constitute a part of this specification, illustrate several aspects described below.

DETAILED DESCRIPTION

Figure 1:
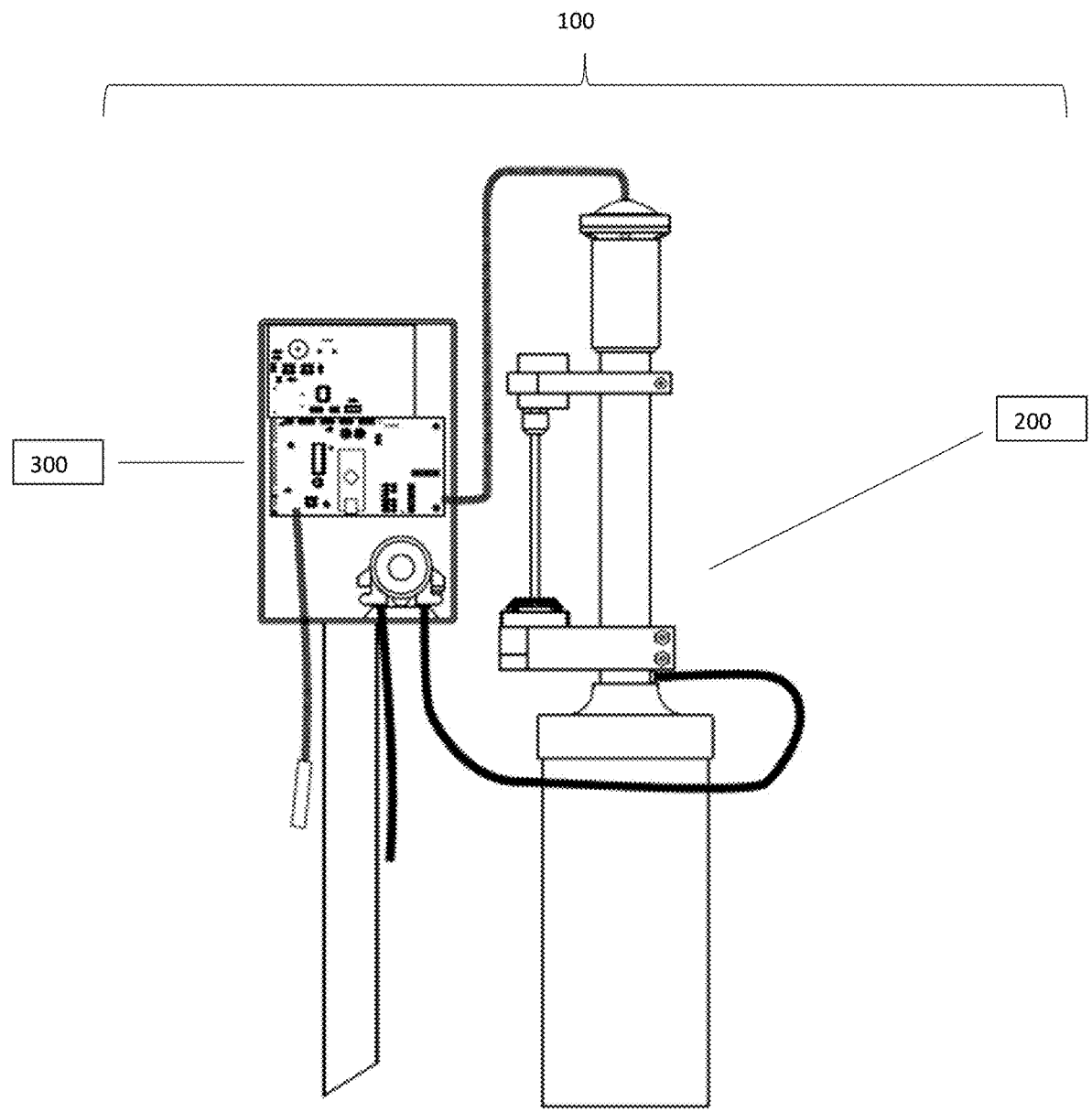
FIG. 1 is a seepage meter diagram.

The devices, materials, articles, and methods described herein may be understood more readily by reference to the following detailed description of specific aspects of the disclosed subject matter and the Examples included therein and to the Figures.

Before the present devices, materials, articles, and methods are disclosed and described, it is to be understood that the aspects described below are not limited to specific methods, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other components.

As used in the description and the appended claims, the singular forms "a," "an," and "the" include plural referents unless the context clearly dictates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Reference will now be made in detail to specific aspects of the disclosed materials, compounds, compositions, articles, and methods, examples of which are illustrated in the accompanying Examples and Figures.

Seepage Meter Device

Turning to FIG. 1, the seepage meter device 100 comprises seepage meter body 200 and an electronics component 300. The device 100 can be installed in any body of water in which one would detect fluctuating water levels.

As can be seen in FIG. 2A-C, which are different angles of the seepage meter body 200, the seepage meter body 200 can be composed of a sensor 201, wherein the sensor can be partially or fully encased in sensor housing 210. The sensor housing 210 can be shaped like a pipe, which, in one embodiment, can be about 1" in diameter. The sensor housing 210 can be made of material such as clear acrylic. The sensor 201 can be coupled, via a coupler 203, to the head 202a of collection tube 202. In one embodiment, the collection tube can be about 6.25" long and about 4" diameter, and can be a thin walled pipe, such as PVC. The coupler 203 connects the distal end of the sensor 201 to the proximal end of the collection tube 202, and can be fitted onto an opening at the head 202a of the collection tube. The coupler 203 can have a port hole 221, which can be connected via a tube to a pump (shown in FIG. 5). A port 204 with a valve 205 can also be on coupler 203.

Figure 3:
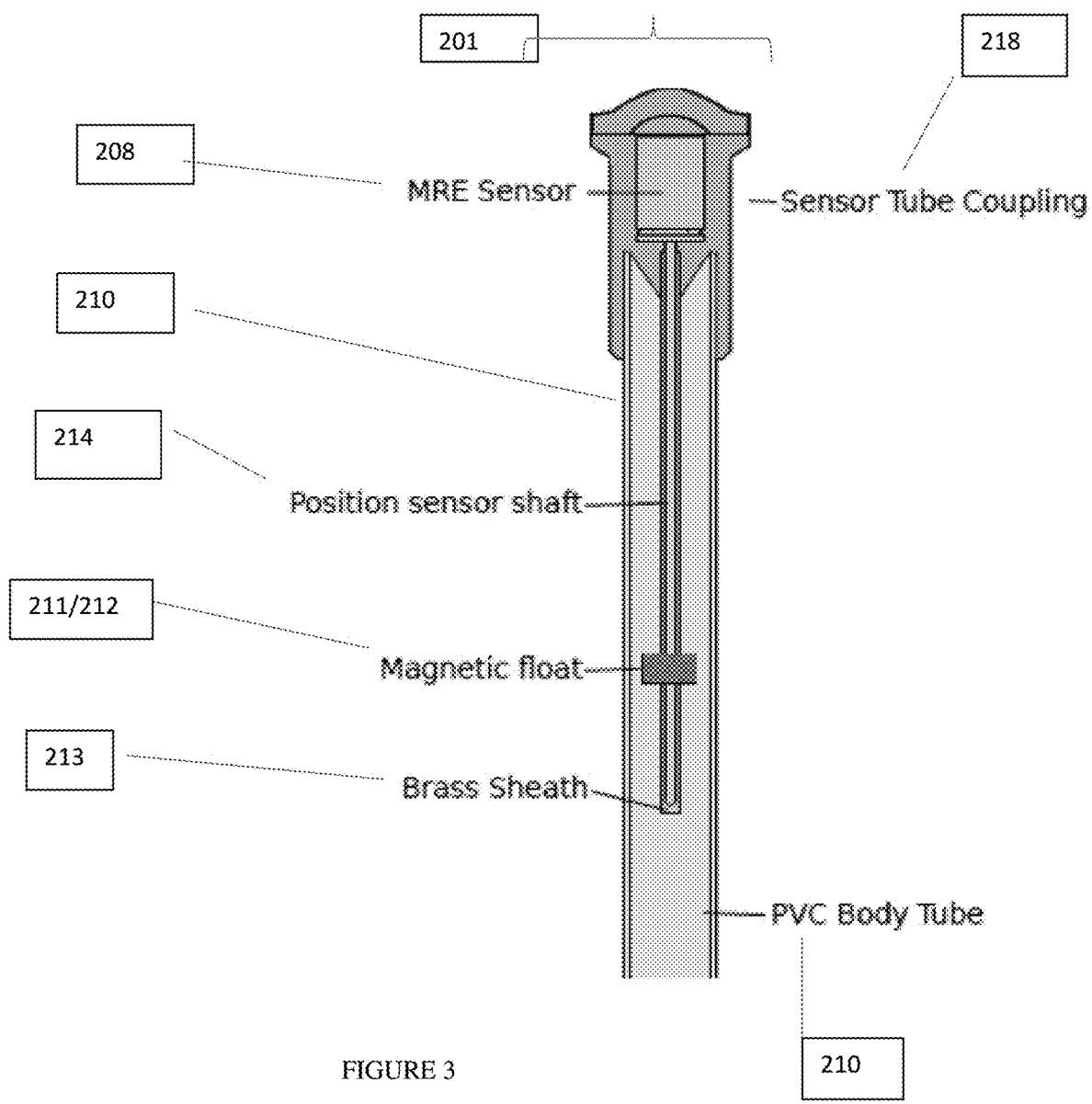
FIG. 3 is a diagram of the sensor mechanism.

FIG. 3 shows a diagram of the sensor 201 component of the seepage meter body 200. The sensor 201 can comprise an MRE sensor 208, which can be housed in sensor tube coupling 218 be a linear position level sensor, such as a Temposonics C-Series linear position sensor. The sensor 201 can comprise a float 211 with a magnet 212. The magnetic float 211/212 can be attached to a position sensor shaft 214. In one embodiment, the magnet comprising the float is a donut shape, so that it can slide up and down the position sensor shaft and "float" according to the water level therein. The position sensor shaft and float comprising the magnet (211/212/214) can be housed in sensor housing 210. The shaft 214 can optionally run the distance of the sensor housing 210, or can be shorter than the sensor housing 210 so that it is attached to the proximal end of the housing at the MRE sensor 208, but not attached or touching the distal end of sensor 201, near coupler 203, and can optionally be capped with a brass sheath 213.

Figure 4:
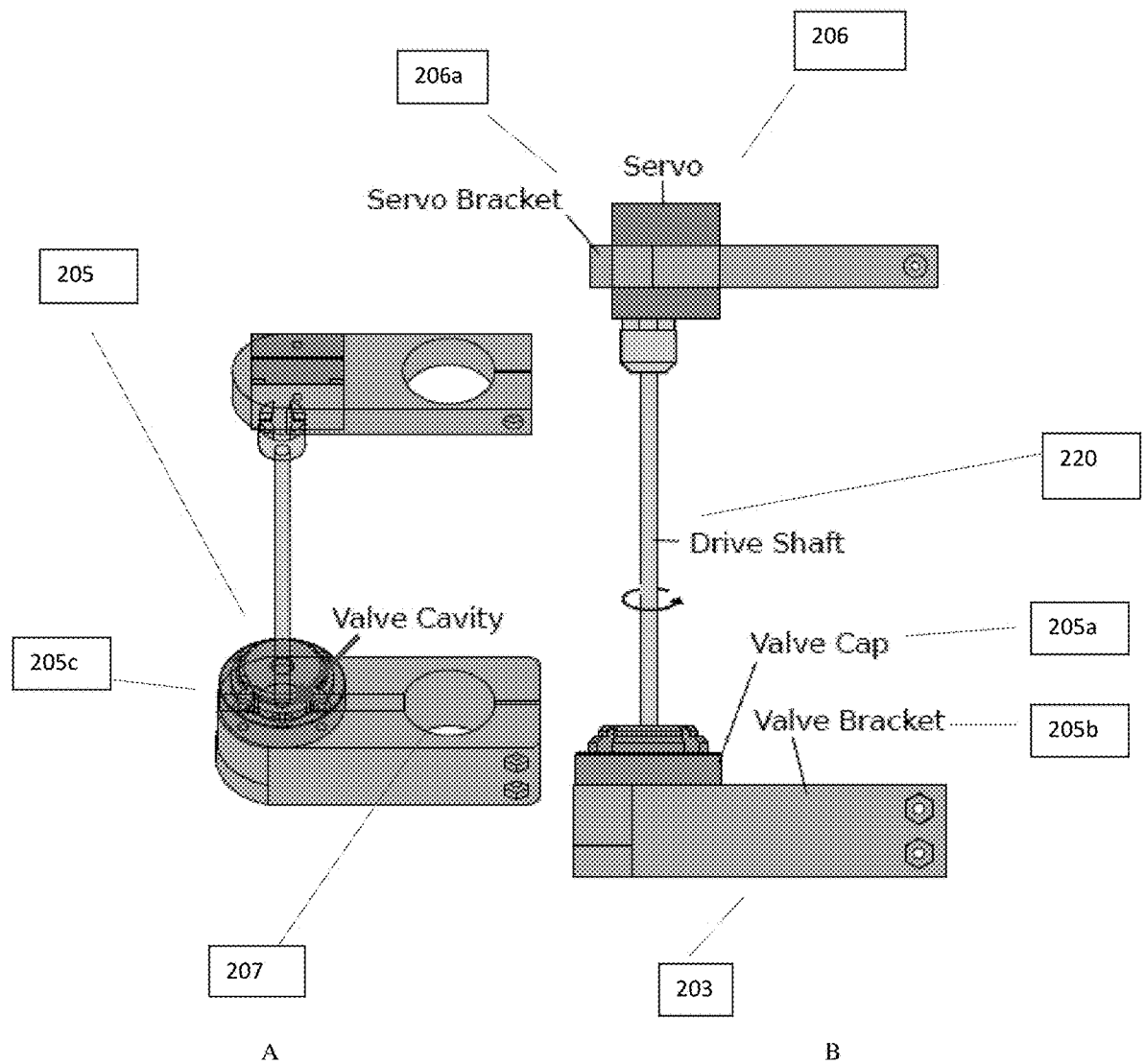
FIG. 4A-B is diagram of the servo motor and mounting brackets to the seepage meter body.

Turning to FIG. 4A-B, a motor 206, such as a servo motor, is connected to a valve mechanism 205 via drive shaft 220 and is capable of opening and closing the sensor tube 201 to the environment. The motor 206 can be attached to a servo bracket 206a. The valve mechanism 205 can comprise a valve cap 205a, a valve bracket 205b, and a valve cavity 205c. There can optionally be a second port in the acrylic tube that connects to a peristaltic pump that can change the water level. Fitting around the distal end of sensor 201 is coupler 203, which is atop the proximal end of collection tube 202.

Figure 2:
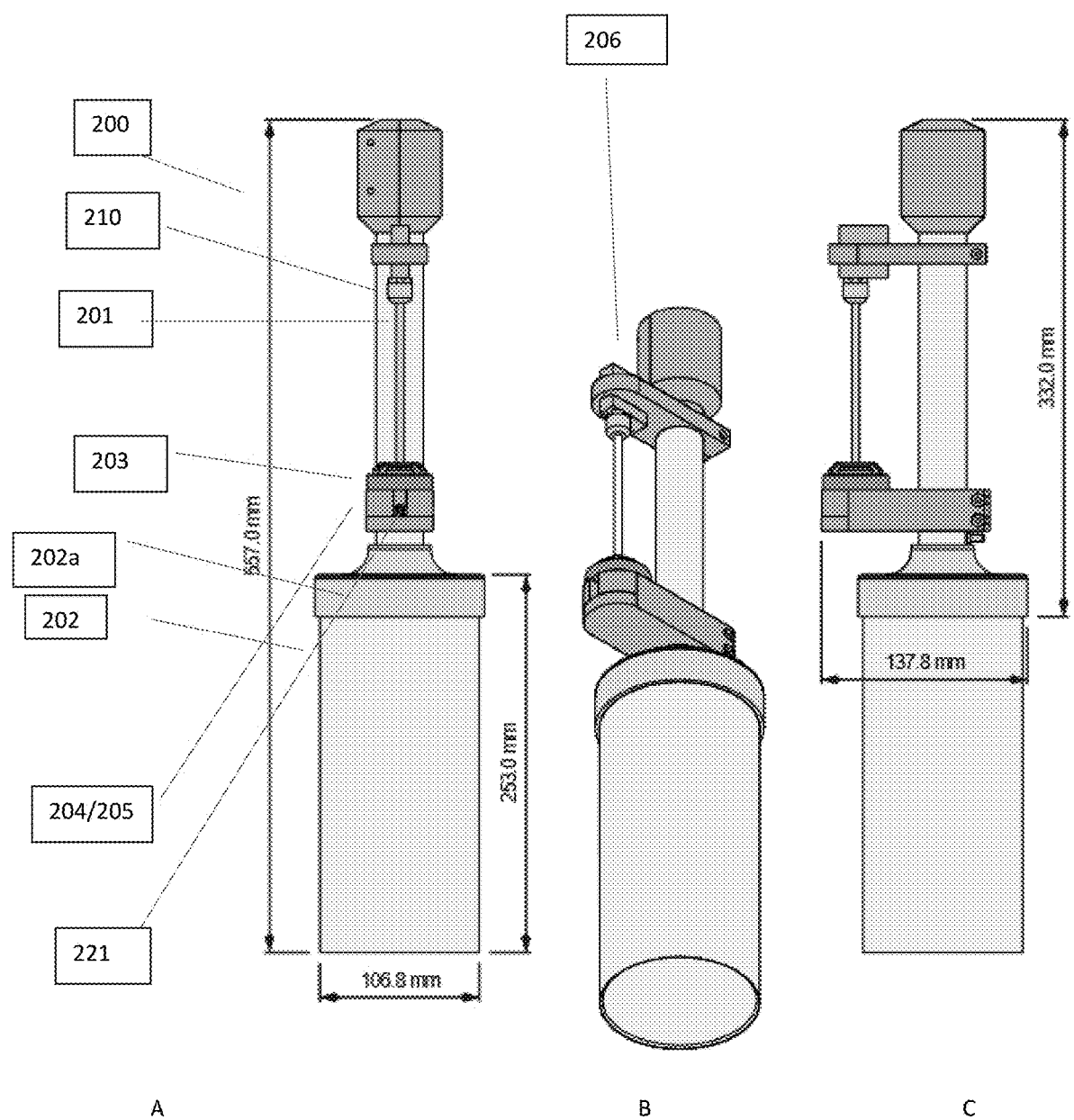
FIG. 2A-C is a diagram of the seepage meter body from three different angles (A, B, C).
Figure 5:
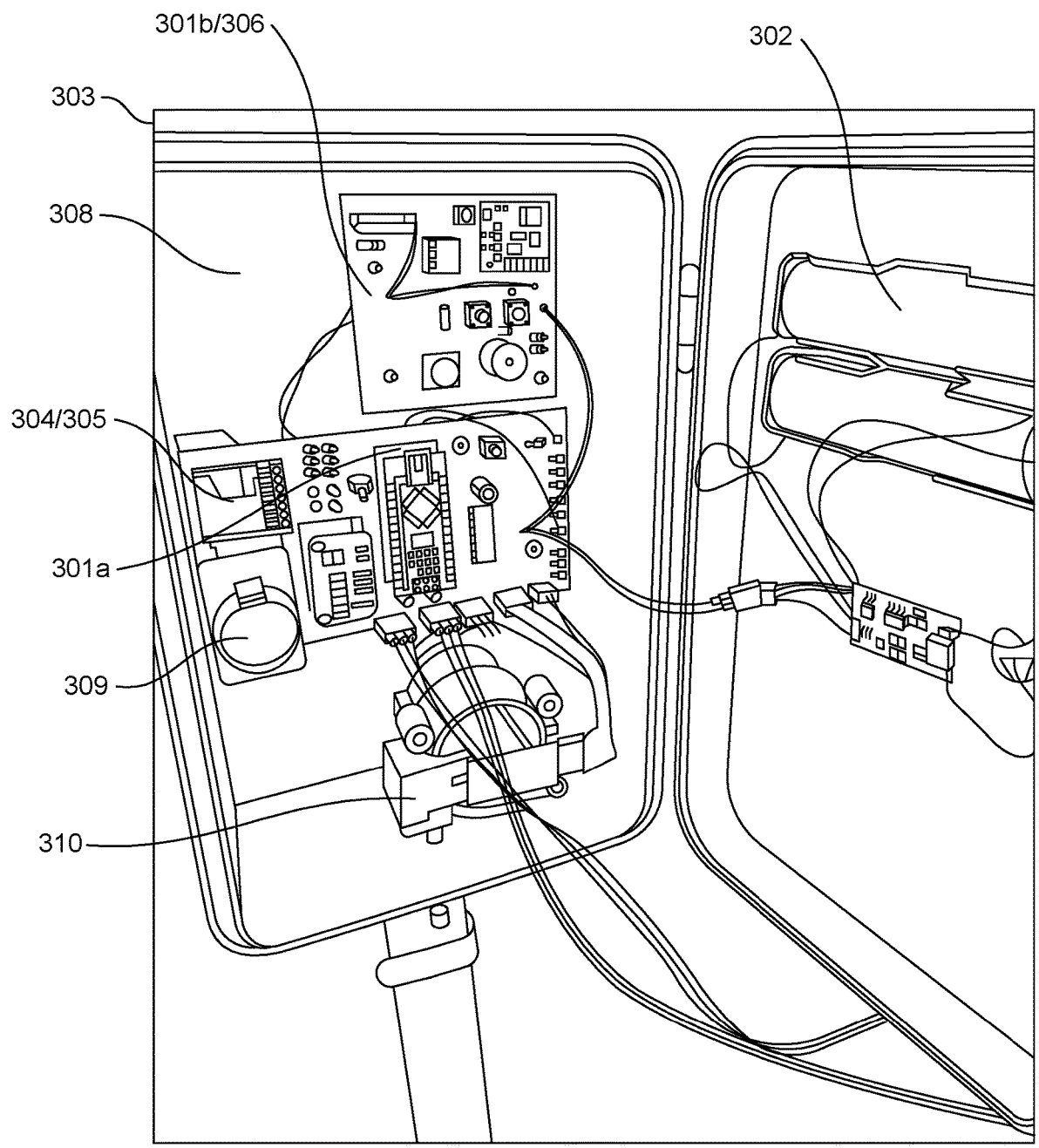
FIG. 5 is a picture of the electronics of the Seepage Meter with (A) real time clock, (B) data logger, (C) daughterboard with watchdog timer, (D) motherboard, (E) pump, and (F) power supply.

As can be seen in FIG. 5, an electronic component 300 is stored in a waterproof electronic housing 308. These include two microcontrollers 301 (a motherboard 301a and daughterboard 301b), and a power supply 302. A solar panel 303 can optionally mounted on the outside of the housing 308. The motherboard 301a controls datalogging, activating the pump 310, and turning the servo motor 206 (as seen in FIG. 2). The datalogger 304 can optionally contain a 16-bit analog to digital converter 305, allowing very high-resolution measurements. The daughterboard 301b uses a timer 306 (which can optionally be referred to herein as a "watchdog timer") to limit power consumption of the device, only providing full power to the mother board 301a when activated at a preset time interval. The electronic component can also include a clock 309.

Methods of Using Seepage Meter Device

Disclosed herein is a method for detecting water levels in an aqueous environment, the method comprising: installing a seepage meter device in a body of water in which water levels are to be measured, wherein said seepage meter device comprises a seepage meter body and an electronics component; wherein the seepage meter body further comprises a collection tube and a sensor; and measuring and recording changing water levels.

Figure 6:
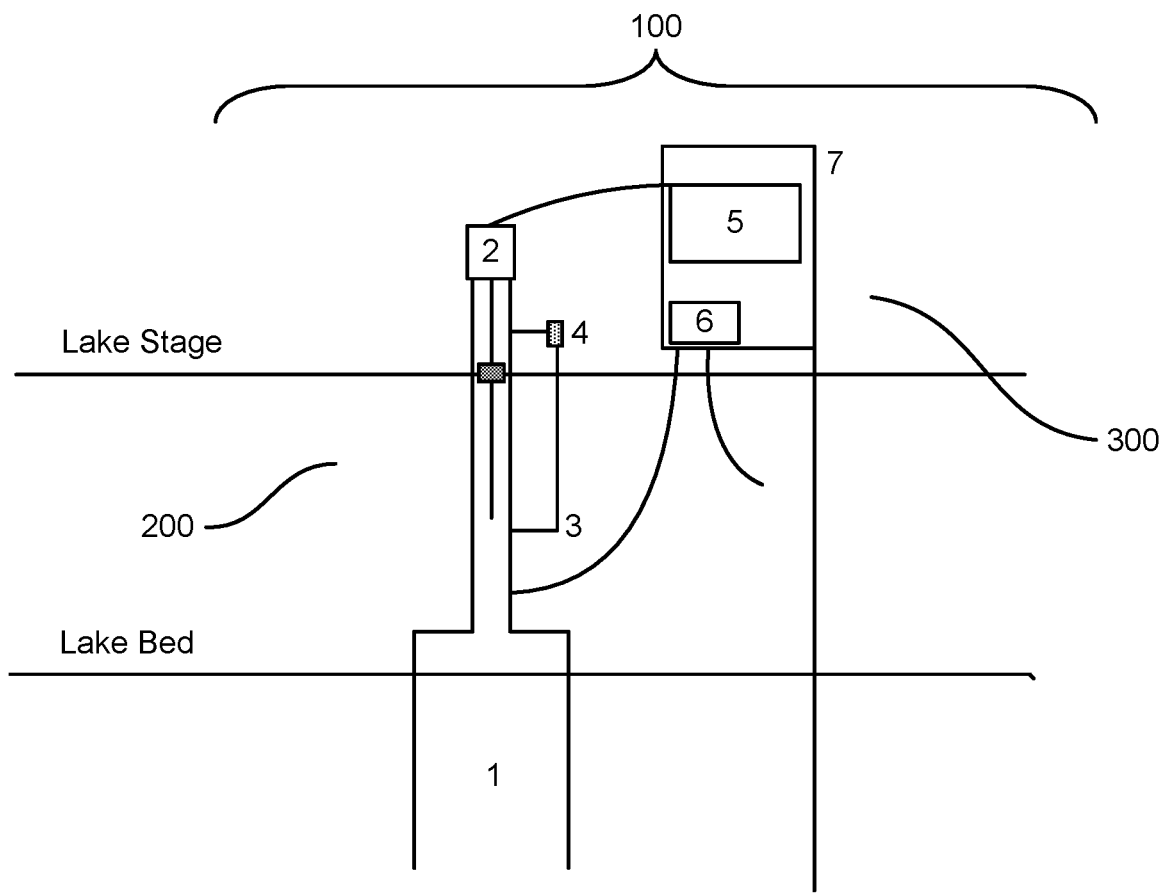
FIG. 6 shows a sketch of Seepage Meter Design with (1) Tube inserted into sediment with an amplification tube of smaller area, (2) Temposonics C-Series linear position sensor with float, (3) Valve to open system to lake, (4) Servo Motor to turn valve, (5) Circuitry, data logger, and power supply, (6) Pump, and (7) Waterproof housing.
Figure 7:
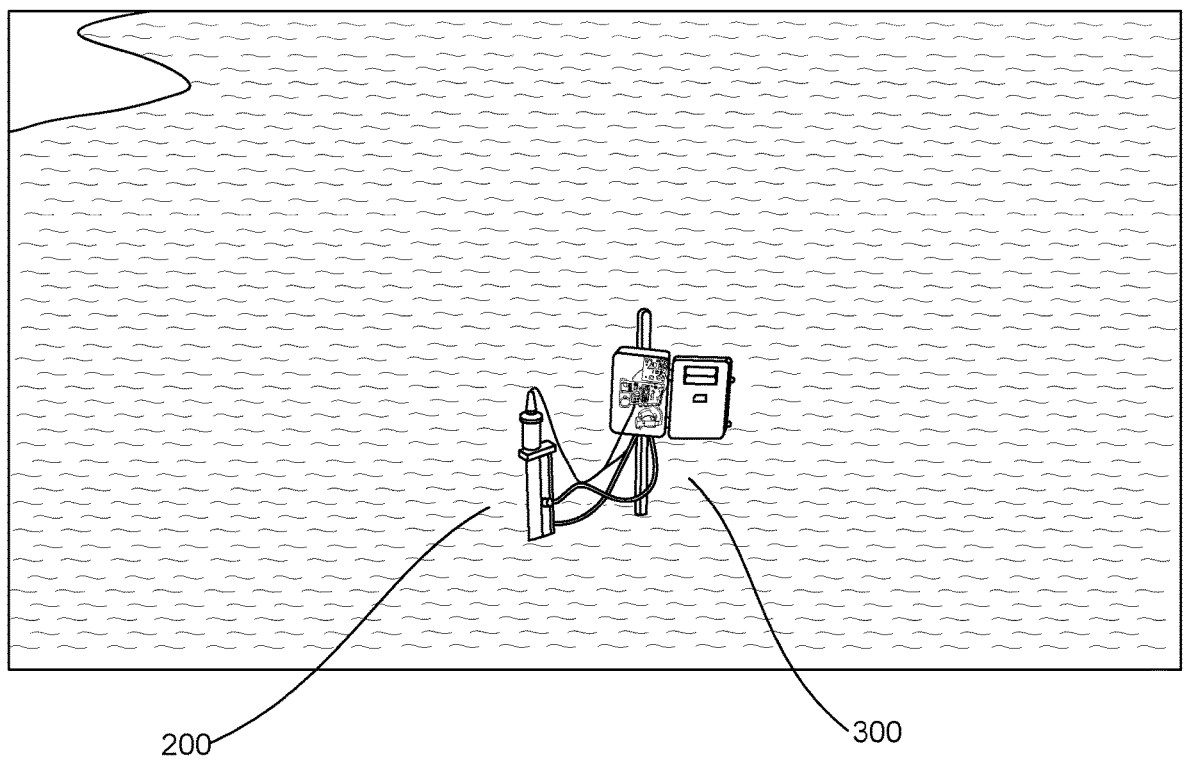
FIG. 7 shows the device installed in a pond.

FIG. 6 and FIG. 7 show the operation of the seepage meter device 100 occurs by installing the seepage meter body 200 and electronic component 300 into sediments of a surface water body by pushing the distal end of body 200 into the sediment bottom, while ensuring the top, or proximal, end of the sensor 201 is exposed to the air. The electronic component 300 is separately installed in the sediment bottom in close proximity to the body 200. The electronic component 300 and body 200 should be close enough that they can be physically connected via tubing for pump 310. After allowing the system to equilibrate with the surface water body, the seepage meter device 100 may be turned on. The servo motor 206 opens the valve, allowing the water level within the sensor 201 to equilibrate with the water body's water stage. This measurement is recorded and the servo motor 206 closes the valve 205. The linear position sensor waits for a period of time to determine if groundwater is seeping out of aquifer into the water body (if the float 211 rises up the sensor 210) or water is recharging from surface water body into the groundwater aquifer (if the float 211 falls). If there is seepage into the water body, the pump 308 will pump water out of the collection tube 202, lowering the internal tube head. If there is recharge into the groundwater aquifer, the pump 310 will pump water into the collection tube 202, raising water in the tube head 202a. The data logger 304 then measures the recovery curve as the internal tube head 202a equilibrates. Data analysis of this recovery curve can provide estimates of seepage rates and hydraulic conductivity of the sediments.

The microcontroller can interface with other systems which can send or receive data. Examples include, but are not limited to, radio interfaces such as LoRa (Long Range) gateway and Bluetooth. Examples of this technology are given in Example 2. The microcontroller of the present invention can have a Serial Peripheral Interface (SPI). This can allow the microcontroller of the seepage meter to interact with a radio. This can allow for command and control of the seepage meter. This means tasks such as reading out data from the memory card, starting or stopping sampling events, resetting the real time clock, etc., can be performed at a distance. In the case of LoRa, this distance can be 10 km away (or closer). The broker machine can be housed in a location with internet to grant users remote command and control, run web-based applications, and create continent wide mesh networks. Bluetooth has a shorter range of up to about 30 meters, but can have higher bandwidth than LoRa. Nonetheless, the implementation of Bluetooth command and control is similar to that of LoRa and has the advantage of being compatible with modern smart phones. Wifi can be paired with either of these technologies. That means the seepage meter can also implement a web server for command and control in addition to Bluetooth and LoRa.

EXAMPLES

The following examples are for purposes of illustration only and are not intended to limit the scope of the claims.

Example 1: Field Test of Seepage Meter Device

The field testing site is a geographically isolated wetland (aka a pond) within the Apalachicola National Forest, located near the Tallahassee International Airport. The pond sits within the Munson Sand Hills province and is an important habitat for endangered amphibians, as the pond periodically dries up and cannot support aquatic predators (Means 2007). Understanding the hydrodynamics of ponds such as these is critical to the conservation of these animals and testing the seepage meter here will also provide insight to future research here.

The Munson Sand Hills are primarily composed of clean quartz sands (Kish et al., 2012). When examined under a microscope, the sand was moderately sorted, subrounded, and has an average diameter of 0.26 mm. When packed in a Darcy Column, it is estimated to have a hydraulic conductivity of $3.49 \times 10^{-2}$ cm/s.

The seepage meter was installed on the south side of the pond. The instrument was allowed to run for approximately 2 hours. The seepage meter was able to collect four usable sets of data in under two hours.

On top of this, the seepage meter device detected negative seepage and performed the negative seepage script each time. On average, the seepage rates were all very slow with a very low average hydraulic conductivity as well. A thick layer of organic material has built up on the pond floor and it is expected that this would result in slow seepage and lower conductance. These lower hydraulic conductance values fall within the general range of silty sands, and an order of magnitude higher than fine grained material (Fetter, 2001). The recovery curve was captured extremely well and this shows the efficacy of this seepage meter device in the field.

Example 2: Seepage Meter Connection and Communication

LoRa LoRa (Long Range) gateway is a proprietary radio technology that utilizes spectrum modulated "chirps" to transmit and receive data packets at long distances from 2 to 1500 kilometers, with little power. This technology is becoming popular for its low power, long range, and cheap price. LoRa has found use in remote areas and during natural disasters, but it has quickly become an infrastructure technology of the future with great potential to build out the "Internet Of Things". LoRa can be used to transmit ordinary data payloads or can be used with a protocol such as Message Queuing Telemetry Transport (MQTT) to serve as nodes in a robust messaging queuing system.

LoRa Communication with MQTT LoRa provides an ordered bidirectional and lossless connection and thus can support the MQTT protocol for communication between transceivers. MQTT is a lightweight, publish-subscribe network protocol that transports messages between devices. MQTT is lightweight, low band-width, and efficient (quick) because it was designed to be used in remote locations and have a small code footprint.

MQTT & Broker Devices running MQTT become nodes in a network. The nodes communicate with a computer running MQTT, referred to as a broker, to handle and pass messages similar to a post office. This "broker" computer can then determine what to do with the message. Further, having control of the broker affords users the ability to transmit and receive a sensor node over LoRa radios or through the internet. MQTT is a technology being used connect many lightweight nodes (usually small sensor nodes) to the internet.

LoRa Seepage Meter LoRa can be connected to any microcontroller that has an SPI interface, therefore most modern microcontrollers, including the seepage meter disclosed herein, can be connected to a common LoRa "postage stamp" radio. In tandem with a broker, such as a field laptop or credit card sized single board computer, communication with the seepage meter, including command and control, is possible. This means tasks such as reading out data from the memory card, starting or stopping sampling events, resetting the real time clock, etc., can be performed at a distance of 2-10 km. Further, if the broker machine is a small computer, it can be housed in a location with internet to grant users remote command and control, run web-based applications, and create continent wide mesh networks.

Bluetooth Bluetooth is another wireless technology used to transmit and receive data between devices. Bluetooth has a short range (usually up to 30 meters) but higher bandwidth than LoRa. Nonetheless, the implementation of Bluetooth command and control is similar to that of LoRa and has the advantage of being compatible with modern smart phones.

WiFi & Radio Flexibility Modern microcontrollers often pair WiFi and Bluetooth technologies. It is possible that including Bluetooth can also include a WiFi radio and full TCP/IP stack. That means the seepage meter can also implement a web server for command and control in addition to Bluetooth and LoRa. The device can utilize a ESP8266 like WiFi transceiver to achieve the same result without Bluetooth.

The presence of so many radios offers the system flexibility for the manufacture to cut costs and offer varying or dynamic implementations of the sensor system.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

REFERENCES

Belanger, T. V, Mikutel, D. F., and Churchill, P. A., 1985, Groundwater seepage nutrient loading in a Florida Lake: Water Research, v. 19, p. 773-781, doi:https://doi.org/10.1016/0043-1354(85)90126-5.

Belanger, T. V, and Montgomery, M. T., 1992, Seepage meter errors: Limnology and Oceanography, v. 37, p. 1787-1795, doi:10.4319/10.1992.37.8.1787.

Burnett, W. C., Kim, G., and Lane-Smith, D., 2001, A continuous monitor for assessment of 222Rn in the coastalocean: Journal of Radioanalytical and Nuclear Chemistry, v. 249, p. 167-172, doi:10.1023/A:1013217821419.

Castro, R. B. P., 2017, Statistical Analysis of Karst Aquifer Pollution, Karst Flow Model Validation at Laboratory Scale, and Development of Seepage Meter: Florida State University, 69-85 p., http://purl.flvc.org/fsu/fd/FSU_SUMMER2017_PachecoCastro_fsu_0071E_14073.

Chanyotha, S., Kranrod, C., Burnett, W. C., Lane-Smith, D., and Simko, J., 2014, Prospecting for groundwater discharge in the canals of Bangkok via natural radon and thoron.: Journal of Hydrology (Amsterdam), v. 519, p. 1485-1492, doi:10.1016/j.jhydrol.2014.09.014.

Downing, D. M., Winer, C., and Wood, L. D., 2003, NAVIGATING THROUGH CLEAN WATER ACT JURISDICTION: A LEGAL REVIEW: Wetlands, v. 23, p. 475-493, https://doi.org/10.1672/0277-5212(2003)023[0475:NTCWAJ]2.0.CO.

Fellows, C. R., and Brezonik, P. L., 1980, SEEPAGE FLOW INTO FLORIDA LAKES1: JAWRA Journal of the American Water Resources Association, v. 16, p. 635-641, doi:10.1111/j.1752-1688.1980.tb02442.x.

Fetter, C. W., 2001, Applied hydrogeology: Upper Saddle River, N.J., Prentice Hall. Harper, H., 2013, Evaluation of Hydrologic Nutrient Loadings from Groundwater Seepage to Lake Jesup.:

Kish, S., Milla, K., and Means, R., 2012, DYNAMICS OF WATER LEVELS IN EPHEMERAL PONDS OF THE MUNSON SANDHILLS, LOWER COASTAL PLAIN OF NORTHWEST FLORIDA.

Krupa, S. L., Belanger, T. V, Heck, H. H., Brock, J. T., and Jones, B. J., 1998, Krupaseep—The Next Generation Seepage Meter: Journal of Coastal Research, p. 210-213, http://www.jstor.org/stable/25736139.

Lee, D. R., 1977, A device for measuring seepage flux in lakes and estuaries1: Limnology and Oceanography, v. 22, p. 140-147, doi:10.4319/10.1977.22.1.0140.

Lucius, M., 2016, Creating a Water and Nutrient Budget for Lake Trafford, Fla., USA, doi:10.1017/CBO9781107415324.004.

Marton, J. M., Creed, I. F., Lewis, D. B., Lane, C. R., Basu, N. B., Cohen, M. J., and Craft, C. B., 2015, Geographically Isolated Wetlands are Important Biogeochemical Reactors on the Landscape: BioScience, v. 65, p. 408-418, doi:10.1093/biosci/biv009.

Means, D. B., 2007, Life Cycles, Dispersal, and Critical Habitat Utilization of Vertebrates Dependent Upon Small Isolated Water Bodies in the Munson Sandhills and Woodville Karst Plain, Leon County, Fla.:

Rosenberry, D. O., and LaBaugh, J. W., 2008, Field Techniques for Estimating Water Fluxes Between Surface Water and Ground Water: U. S. Geological Survey Techniques and Methods 4-D2, p. 71-114.

Rosenberry, D., LaBaugh, J., and Hunt, R., 2008, Use of monitoring wells, portable piezometers, and seepage meters to quantify flow between surface water and ground water: D2 p.

Rosenberry, D. O., and Menheer, M. A., 2006, A system for calibrating seepage meters used to measure flow between ground water and surface water: US Geological Survey Scientific Investigations Report 2006-5053.

Schiffer, D. M., 1998, Hydrology of Central Florida Lakes—A Primer: doi:10.3133/cir1137.

Shaw, R. D., and Prepas, E. E., 1990, Groundwater-lake interactions: I. Accuracy of seepage meter estimates of lake seepage: Journal of Hydrology, v. 119, p. 105-120, doi:https://doi.org/10.1016/0022-1694(90)90037-X.

Smith, C. F., Chadwick, D. B., Paulsen, R. J., and Groves, J. G., 2003, Development and deployment of an ultrasonic groundwater seepage meter: a reliable way to measure groundwater seepage, in Oceans 2003. Celebrating the Past . . . Teaming Toward the Future (IEEE Cat. No. 03CH37492), v. 1, p. 149-157 Vol. 1, doi:10.1109/OCEANS.2003.178537.

Solder, J., Gilmore, T., Genereux, D., and Solomon, D., 2016, A Tube Seepage Meter for In Situ Measurement of Seepage Rate and Groundwater Sampling: Ground water, v. 54, p. 588-595, doi:10.1111/gwat.12388.

Taniguchi, M., and Fukuo, Y., 1993, Continuous Measurements of Ground-Water Seepage Using an Automatic Seepage Meter: Groundwater, v. 31, p. 675-679, doi: 10.1111/j.1745-6584.1993.tb00601.x.

Thomas, S., and Lucius, M., 2016, Groundwater seepage nutrient loading in a recently dug wet detention stormwater pond: Florida Scientist, v. 79, p. 132-146, http://www.jstor.org/stable/44113170. 56

Tiner, R., 2003, Geographically isolated wetlands of the United States: Wetlands, v. 23, p. 494-516, doi: 10.1672/0277-5212(2003)023%5B0494:GIWOTU%5D2.0.CO;2.

Winter, T. C., 1981, UNCERTAINTIES IN ESTIMATING THE WATER BALANCE OF LAKES1: JAWRA Journal of the American Water Resources Association, v. 17, p. 82-115, doi:10.1111/j.1752-1688.1981.tb02593

What is claimed is:

1. A seepage meter device comprising a seepage meter body and an electronics component;
   wherein the seepage meter body comprises a collection tube and a sensor;
   wherein the electronics component is capable of measuring and recording changing water levels;
   wherein the seepage meter body and the electronics component are separate and can be connected via tubing; and
   wherein the electronics component comprises a pump, wherein the electronics component is configured to control the pump to automatically remove or add water to the collection tube via the tubing in response to the changing water levels.

2. The seepage meter device of claim 1, wherein the sensor and collection tube are coupled via a coupler.

3. The seepage meter device of claim 2, wherein the seepage meter device comprises a port with a valve coupled to the sensor via a sensor housing.

4. The seepage meter device of claim 1, wherein the sensor is a linear position level sensor.

5. The seepage meter device of claim 4, wherein the sensor is a Temposonics C-Series sensor.

6. The seepage meter device of claim 1, wherein a float with a magnet is enclosed within a sensor housing, and further wherein the float with the magnet are fitted around the sensor.

7. The seepage meter device of claim 6, wherein a position sensor shaft connects the sensor to the float with a magnet.

8. The seepage meter device of claim 1, wherein the seepage meter device further comprises a motor in communication with a valve mechanism, wherein the valve mechanism is capable of opening and closing the sensor.

9. The seepage meter device of claim 8, wherein the valve mechanism comprises a valve cap, a valve bracket, and a valve cavity.

10. The seepage meter device of claim 1, wherein the electronic component comprises a waterproof electronic housing, at least two microcontrollers, and a power supply.

11. The seepage meter device of claim 10, wherein said at least two microcontrollers collectively comprise a motherboard and daughterboard.

12. The seepage meter device of claim 10, wherein at least one microcontroller comprises a timer, wherein said timer is capable of limiting power consumption of the seepage meter device.

13. The seepage meter device of claim 12, wherein said timer only provides full power to a microcontroller when the microcontroller is activated at a preset time interval.

14. The seepage meter device of claim 1, wherein said electronics component further comprises a solar panel.

15. The seepage meter device of claim 1, wherein said electronics component can interface with radio technology to transmit and receive data packets.

16. The seepage meter device of claim 15, wherein said radio technology is Long Range (LoRa) or Bluetooth or WIFI.

17. A method for detecting water levels in an aqueous environment, the method comprising:
    a. installing a seepage meter device in a body of water in which water levels are to be measured, wherein said seepage meter device comprises a seepage meter body and an electronics component; wherein the seepage meter body further comprises a collection tube and a sensor; and wherein the electronics component is capable of measuring and recording changing water levels; and
    b. measuring and recording changing water levels;
    wherein the seepage meter body and the electronics component are separate and can be connected via tubing; and
    wherein the electronics component comprises a pump, wherein the electronics component is configured to control the pump to automatically remove or add water to the collection tube via the tubing in response to the changing water levels.

18. The method of claim 17, wherein a distal end of the seepage meter body is installed in a sediment bottom of a water body, and a proximal end of the seepage meter body is exposed to air.

19. The method of claim 17, wherein the electronic component is separately installed in a sediment bottom in close proximity to the seepage meter body.

20. The method of claim 17, wherein the seepage meter body further comprises a motor and a valve, wherein the motor opens the valve, allowing the water level within the collection tube to equilibrate with a water stage of the body of water.

21. The method of claim 20, wherein, when the valve is opened, a water level measurement is recorded.

22. The method of claim 21, wherein, after the water level measurement is recorded, the motor closes the valve.

* * * * *